(12) United States Patent
Duy et al.

(10) Patent No.: US 12,051,184 B2
(45) Date of Patent: Jul. 30, 2024

(54) ABNORMALITY DETECTION DEVICE, ABNORMALITY DETECTION COMPUTER PROGRAM PRODUCT, AND ABNORMALITY DETECTION SYSTEM (71) Applicant: AISIN CORPORATION, Kariya (JP)

(72) Inventors: Truong Vinh Truong Duy, Kariya (JP); Naotake Natori, Kariya (JP)

(73) Assignee: AISIN CORPORATION, Kariya (JP)

( * ) Notice: Subject to any disclaimer, the term of this patent is extended or adjusted under 35 U.S.C. 154(b) by 407 days.

(21) Appl. No.: 17/402,925

(22) Filed: Aug. 16, 2021

(65) Prior Publication Data

US 2022/0084190 A1 Mar. 17, 2022

(30) Foreign Application Priority Data

Sep. 15, 2020 (JP) .................................. 2020-154964

(51) Int. Cl.
  *G06T 7/00* (2017.01)
  *G06T 7/20* (2017.01)
  *G06T 7/70* (2017.01)

(52) U.S. Cl.
  CPC .............. *G06T 7/0004* (2013.01); *G06T 7/20* (2013.01); *G06T 7/70* (2017.01); *G06T 2207/20081* (2013.01); *G06T 2207/30164* (2013.01)

(58) Field of Classification Search
  CPC . G06T 2207/20081; G06T 2207/20084; G06T 2207/30252; G06T 2207/10028;
  (Continued)

(56) References Cited

U.S. PATENT DOCUMENTS

| 10,346,969 B1 * | 7/2019 | Raghu ...................... G06N 3/08 |
| 2012/0087566 A1 * | 4/2012 | Mori ..................... G06T 7/0004 |
| | | 382/141 |

(Continued)

FOREIGN PATENT DOCUMENTS

| JP | 2002168793 A * | 6/2002 |
| JP | 4905707 B2 * | 3/2012 |

(Continued)

*Primary Examiner* — Ian L Lemieux
*Assistant Examiner* — Woo C Rhim
(74) *Attorney, Agent, or Firm* — Oblon, McClelland, Maier & Neustadt, L.L.P.

(57) ABSTRACT

An abnormality detection device includes an acquisition process unit that acquires plural captured images captured by an imaging device to image an object in different positions or postures in a mode in which a relative positional or postural relationship between the imaging device and the object is specifiable in each of the plural captured images, an extraction process unit that extracts plural abnormality-candidate images in which an abnormality-candidate part is imaged from the plural captured images, the abnormality-candidate part corresponding to a part that possibly includes an abnormality on a surface of the object, an estimation process unit that estimates a depth of the abnormality-candidate part with respect to the surface of the object, and a detection process unit that detects whether the abnormality-candidate part corresponds to abnormal based on the depth of the abnormality-candidate part in each of the plural abnormality-candidate images.

7 Claims, 7 Drawing Sheets (58) Field of Classification Search
CPC ..... G06T 7/0004; G06T 7/0002; G06T 7/001; G06T 7/50; G06T 7/70; G06T 2207/10016; G06T 2207/30248; G06T 2207/30244; G06T 2207/30108; G06T 7/174; G06T 7/529; G06T 7/55; G06T 7/20; G06T 2207/30164; G06V 10/82

See application file for complete search history.

(56) References Cited

U.S. PATENT DOCUMENTS

| | | | | |
|---|---|---|---|---|
| 2015/0302594 | A1* | 10/2015 | Moore | G06T 7/521 348/47 |
| 2016/0203593 | A1* | 7/2016 | Henkemeyer | G01N 21/93 382/152 |
| 2017/0122878 | A1* | 5/2017 | Ono | G01B 11/245 |
| 2018/0122060 | A1* | 5/2018 | Shirkhodaie | G06T 7/0008 |
| 2018/0348144 | A1* | 12/2018 | Ando | G01N 21/8806 |
| 2018/0348146 | A1* | 12/2018 | Ando | G01N 21/55 |
| 2019/0120770 | A1* | 4/2019 | Chen | G01B 11/303 |
| 2019/0132524 | A1* | 5/2019 | Hashiguchi | G06T 7/0008 |
| 2019/0164269 | A1* | 5/2019 | Kläger | G06T 7/571 |
| 2020/0226734 | A1* | 7/2020 | Kumar | G07C 5/10 |
| 2020/0258208 | A1* | 8/2020 | Lota | G06N 20/00 |
| 2020/0364906 | A1* | 11/2020 | Shimodaira | G06V 10/82 |
| 2021/0027442 | A1* | 1/2021 | Price | G06N 3/08 |
| 2021/0318252 | A1* | 10/2021 | Cho | G06T 7/0004 |
| 2022/0415020 | A1* | 12/2022 | Kashanipour | B23K 31/125 |

FOREIGN PATENT DOCUMENTS

| | | | |
|---|---|---|---|
| JP | 2017-40559 A | | 2/2017 |
| JP | 2017040559 A | * | 2/2017 |
| JP | 6287248 B2 | * | 3/2018 |
| JP | 6287248 B2 | | 3/2018 |
| JP | 2019032268 A | * | 2/2019 |
| JP | 2020-8501 A | | 1/2020 |
| JP | 2020008501 A | * | 1/2020 |
| WO | WO-2019177539 A1 | * | 9/2019 ........... G06K 9/4642 |
| WO | WO-2021201349 A1 | * | 10/2021 ............... G06K 9/62 |

* cited by examiner

ABNORMALITY DETECTION DEVICE, ABNORMALITY DETECTION COMPUTER PROGRAM PRODUCT, AND ABNORMALITY DETECTION SYSTEM

CROSS REFERENCE TO RELATED APPLICATIONS

This application is based on and claims priority under 35 U.S.C. § 119 to Japanese Patent Application 2020-154964, filed on Sep. 15, 2020, the entire content of which is incorporated herein by reference.

TECHNICAL FIELD

This disclosure generally relates to an abnormality detection device, an abnormality detection computer program product, and an abnormality detection system.

BACKGROUND DISCUSSION

A known technology detecting an abnormality of an object based on two-dimensional characteristics calculated by captured images obtained by capturing the images of an object is disclosed in JP6287248B (hereinafter referred to as Patent reference 1).

However, there is a case where defects which should be detected as abnormal and mere contamination which does not have to be detected as abnormal are hardly distinguished with each other. Thus, according to Patent reference 1, the mere contamination tends to be detected excessively or immoderately as abnormal.

A need thus exists for an abnormality detection device, an abnormality detection computer program product, and an abnormality detection system which are not susceptible to the drawback mentioned above.

SUMMARY

According to an aspect of this disclosure, an abnormality detection device includes an acquisition process unit configured to acquire plural captured images captured by an imaging device to image an object in different positions or postures in a mode in which a relative positional or postural relationship between the imaging device and the object is specifiable in each of the plural captured images, an extraction process unit configured to extract plural abnormality-candidate images in which an abnormality-candidate part is imaged from the plural captured images, the abnormality-candidate part corresponding to a part that possibly includes an abnormality on a surface of the object, an estimation process unit configured to estimate a depth of the abnormality-candidate part with respect to the surface of the object in each of the plural abnormality-candidate images based on a change of the abnormality-candidate part between the plural abnormality-candidate images, and a detection process unit configured to detect whether the abnormality-candidate part corresponds to abnormal based on the depth of the abnormality-candidate part in each of the plural abnormality-candidate images.

According to another aspect of this disclosure, an abnormality detection computer program product includes steps of acquiring plural captured images captured by an imaging device to image an object in different positions or postures in a mode in which a relative positional or postural relationship between the imaging device and the object is specifiable in each of the plural captured images, extracting plural abnormality-candidate images in which an abnormality-candidate part is imaged from the plural captured images, the abnormality-candidate part corresponding to a part that possibly includes an abnormality on a surface of the object, estimating a depth of the abnormality-candidate part with respect to the surface of the object in each of the plural abnormality-candidate images based on a change of the abnormality-candidate part between the plural abnormality-candidate images, and detecting whether the abnormality-candidate part corresponds to abnormal based on the depth of the abnormality-candidate part in each of the plural abnormality-candidate images.

According to still another aspect of this disclosure, an abnormality detection system includes an imaging device configured to image an object and an abnormality detection device including an acquisition process unit configured to acquire plural captured images captured by an imaging device to image an object in different positions or postures in a mode in which a relative positional or postural relationship between the imaging device and the object is specifiable in each of the plural captured images, an extraction process unit configured to extract plural abnormality-candidate images in which an abnormality-candidate part is imaged from the plural captured images, the abnormality-candidate part corresponding to a part that possibly includes an abnormality on a surface of the object, an estimation process unit configured to estimate a depth of the abnormality-candidate part with respect to the surface of the object in each of the plural abnormality-candidate images based on a change of the abnormality-candidate part between the plural abnormality-candidate images, and a detection process unit configured to detect whether the abnormality-candidate part corresponds to abnormal based on the depth of the abnormality-candidate part in each of the plural abnormality-candidate images.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment and modified examples thereof of the disclosure will hereunder be explained with reference to the drawings.

A technology of the embodiment is used for such as visual inspection for an object of any types, for example, parts of a vehicle. One of the technologies for visual inspection is a technology detecting an abnormality of the object based on two-dimensional characteristics calculated by a captured image obtained by capturing the images of the object.

However, there is a case where defects which should be detected as abnormal and mere contamination which does not have to be detected as abnormal are hardly distinguished with each other. Thus, according to the conventional technology, the mere contamination tends to be detected excessively or immoderately as abnormal.

Therefore, in the embodiment, the mere contamination is inhibited from being detected excessively or immoderately as abnormal based on a configuration and a process explained below.

Figure 1:
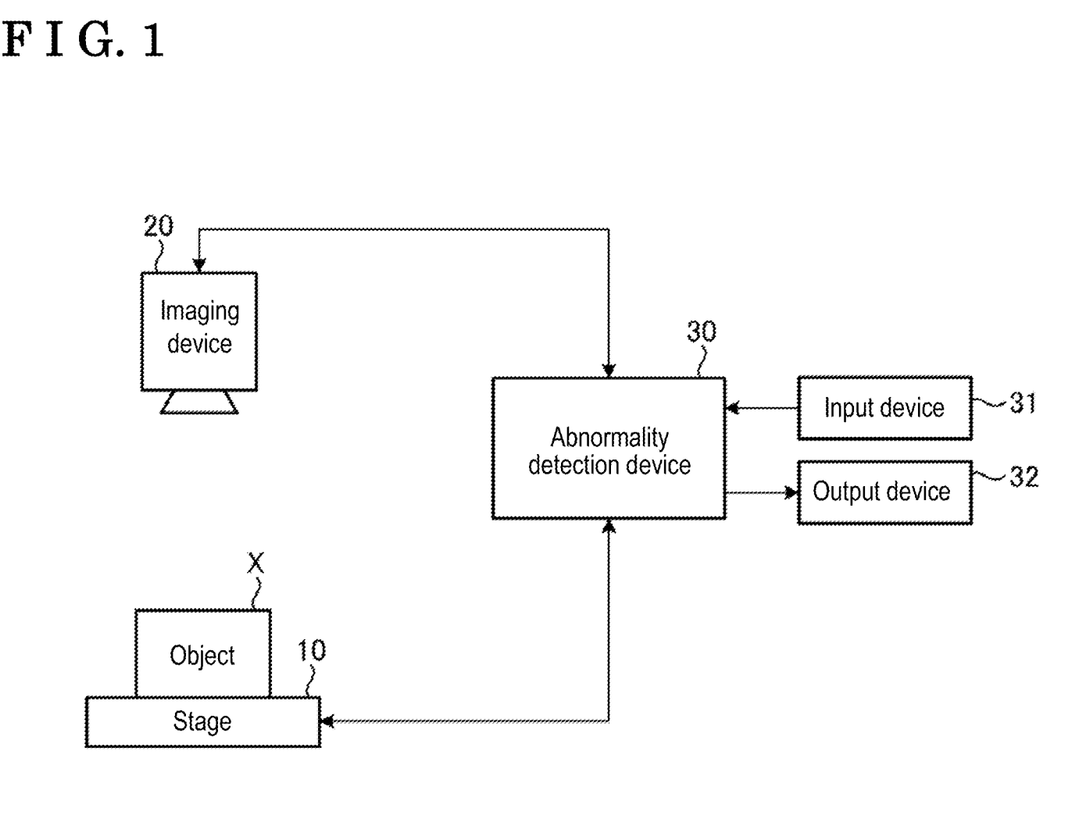
FIG. 1 is an exemplified and schematic block diagram illustrating a whole structure of an abnormality detection system according to an embodiment disclosed here.

As shown in FIG. 1, an abnormality detection system of the embodiment includes a stage 10, an imaging device 20, and an abnormality detection device 30.

The stage 10 supports or holds an object X. The stage 10 is configured to change a posture of the object X seen from the imaging device 20, that is, an orientation of the object X with respect to the imaging device 20.

Figure 2:
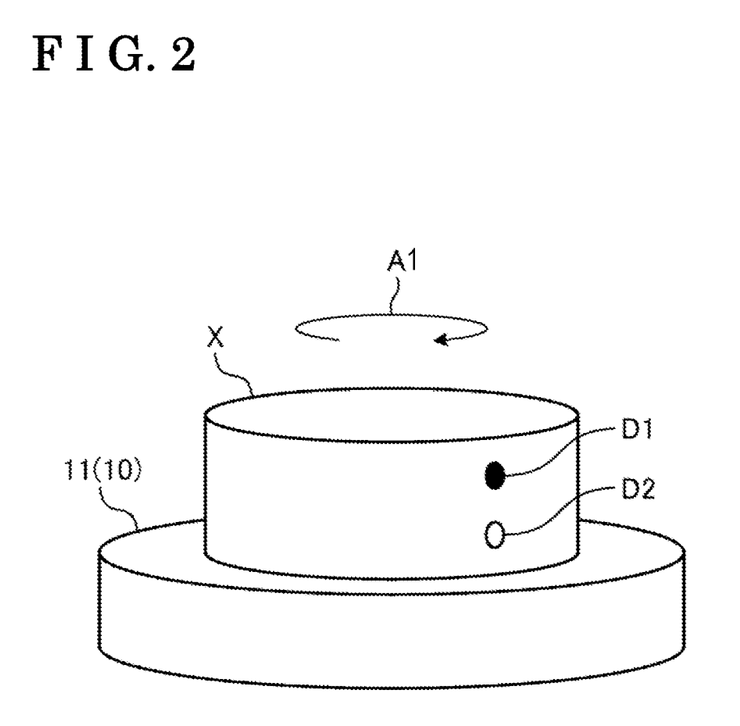
FIG. 2 is an exemplified and schematic view illustrating an object and a stage according to the embodiment.

As shown in FIG. 2, the stage 10 is configured as a so-called single-axis rotary stage. That is, the stage 10 includes a rotary pedestal 11 supporting or holding the object X to be rotatable in a direction of an arrow A1. The rotary pedestal 11 is driven by an actuator. Accordingly, the stage 10 continuously changes the orientations of the object X seen from the imaging device 20 and positions of a defect D1 and a contamination D2 of a surface of the object X seen from the imaging device 20.

The object X is, for example, a molded part. In this case, the defect D1 is a detected target that should be detected as abnormal such as a dent, and the contamination D2 is a non-detected target that does not have to be detected as abnormal such as a contamination, chips or oil.

In an example shown in FIG. 2, the object X includes both the defect D1 and the contamination D2. Actually, there may be a case where one of the defect D1 and the contamination D2 is included in the object X, and where the object X includes neither the defect D1 nor the contamination D2.

In the example shown in FIG. 2, the object X is illustrated as a circular cylinder for the convenience of explanation. The object X can be formed in any shapes.

In FIG. 1, the imaging device 20 is configured as a camera imaging the surface of the object X. The imaging device 20 continuously images the object X which is moved by the stage 10 at plural timings, and acquires plural captured images of the object X which is in different postures or orientations. In the embodiment, the imaging device 20 is fixedly arranged or disposed at a position where the object X on the stage 10 can be imaged.

Here, in the embodiment, each of the images is captured in a state where the relative postures of the imaging device 20 and the object X are specifiable. For example, in the embodiment, the imaging device 20 captures the image at a certain time interval under a condition in which the posture of the object X is changed at a certain speed. According to this imaging condition, the relative posture relationship between the imaging device 20 and the object X of the captured image can be specified, and the change of the way the object X is imaged between the plural captured images, for example, the change of the positions at which the defect D1 and the contamination D2 are imaged, can be traced.

In the embodiment, an encoder detecting the rotary angle of the rotary pedestal 11 can be used to specify the posture of the object X at each of the imaging timings. According to the configuration, even though the changing speed of the posture of the object X and the time interval at which the imaging device 20 operates are not constant, the relative relationship between the postures of the imaging device 20 and the object X in the captured image can be specified.

The abnormality detection device 30 is configured to accept operation input by a user via an input device 31, and to output information of images to an output device 32. The abnormality detection device 30 detects the abnormality of the object X based on functions shown in FIG. 3.

Figure 3:
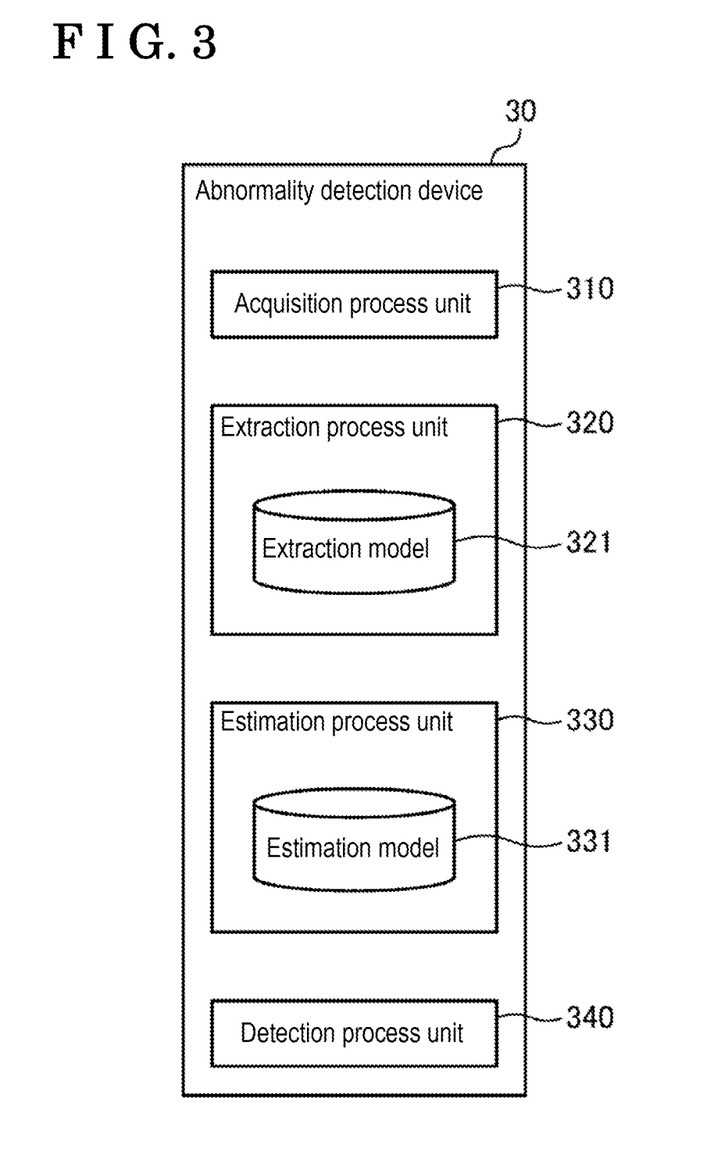
FIG. 3 is an exemplified and schematic block diagram illustrating functions of an abnormality detection device according to the embodiment.

As shown in FIG. 3, the abnormality detection device 30 of the embodiment includes an acquisition process unit 310, an extraction process unit 320, an estimation process unit 330, and a detection process unit 340 as functional modules.

The acquisition process unit 310 acquires captured images from the imaging device 20. That is, the acquisition process unit 310 acquires plural captured images captured by the imaging device 20 such that the object X is imaged at different positions or postures based on the aforementioned configuration in a mode where the relative relationship between the postures of the imaging device 20 and the object X in each of the plural captured images can be specified. The acquisition process unit 310 can acquire data of a three-dimensional shape of the surface of the object X.

The extraction process unit 320 extracts plural abnormality-candidate images which have abnormality-candidate parts that possibly include abnormalities on the surface of the object X from the plural captured images obtained by the acquisition process unit 310. In the embodiment, both the defect D1 and the contamination D2 correspond to the abnormality-candidate parts.

The extraction process unit 320 extracts the abnormality-candidate part images from the captured image by using an extraction model 321 which is previously configured or established in advance. The extraction model 321 corresponds to a trained model shown in FIG. 4, the model trained by machine learning based on the captured image acquired under a similar condition as in the embodiment and samples of the abnormality-candidate part.

Figure 4:
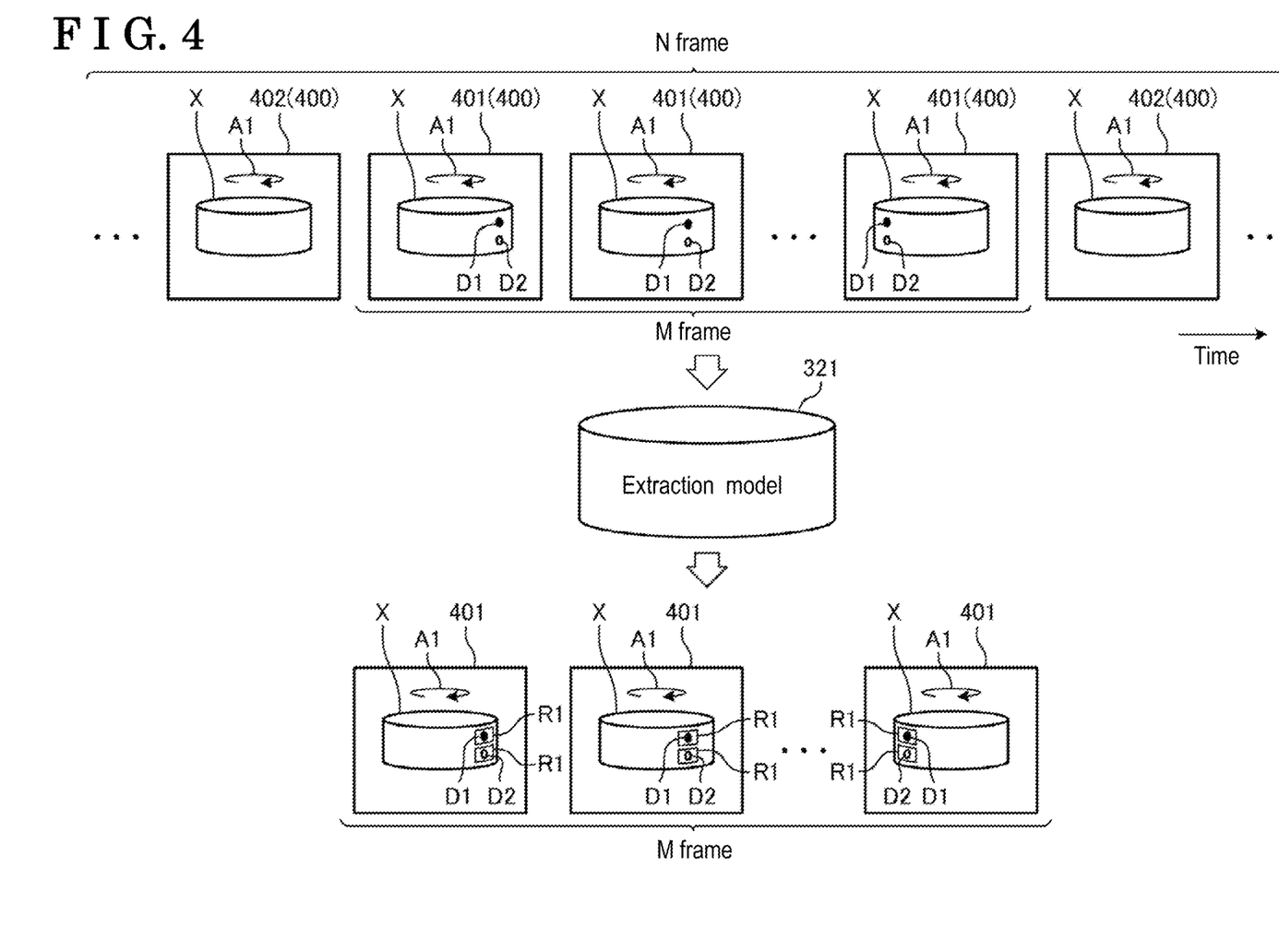
FIG. 4 is an exemplified and schematic view illustrating an extraction model of the embodiment.

In an example shown in FIG. 4, an image 400 by an N frame showing that the object X rotates in the direction of the arrow A1 is inputted to the extraction model 321 as a captured image. The image 400 includes an image 401 by an M frame (which is smaller than the N frame) which includes the defect D1 and the contamination D2, and an image 402 which does not include the defect D1 and the contamination D2.

The extraction model 321 of the embodiment outputs the image 401 as the abnormality-candidate image in response to the input of the image 400 as the captured image, the image 401 including the object with the defect D1 and the contamination D2 as an abnormality-candidate part. Here, the extraction model 321 outputs the image including the abnormality-candidate part in a state where an area R1 where the defect D1 and the contamination D2 serving as the abnormality-candidate parts are imaged is specified. Accordingly, the change of the abnormality-candidate part among the abnormality-candidate images can be traced.

In FIG. 3, the estimation process unit 330 estimates the depth of the abnormality-candidate part among the plural abnormality-candidate images with respect to the surface of the object X based on the change of the abnormality-candidate part between the plural abnormality-candidate images extracted from the extraction process unit 320. The depth can be also referred to as height.

The estimation process unit 330 estimates the depth of the abnormality-candidate part of the abnormality-candidate image based on the result of tracing the change of the position and the luminance or brightness of the abnormality-candidate part between the abnormality-candidate images using a pre-designed estimation model 331. The estimation model 331 is a trained model shown in FIG. 5, the model trained by machine learning based on samples of the abnormality-candidate image acquired under the same condition as in the embodiment and an actual value of the depth of the abnormality-candidate part which corresponds to the samples to output the depth of the abnormality-candidate part of the plural abnormality-candidate images in response to the input of the plural abnormality-candidate images.

Figure 5:
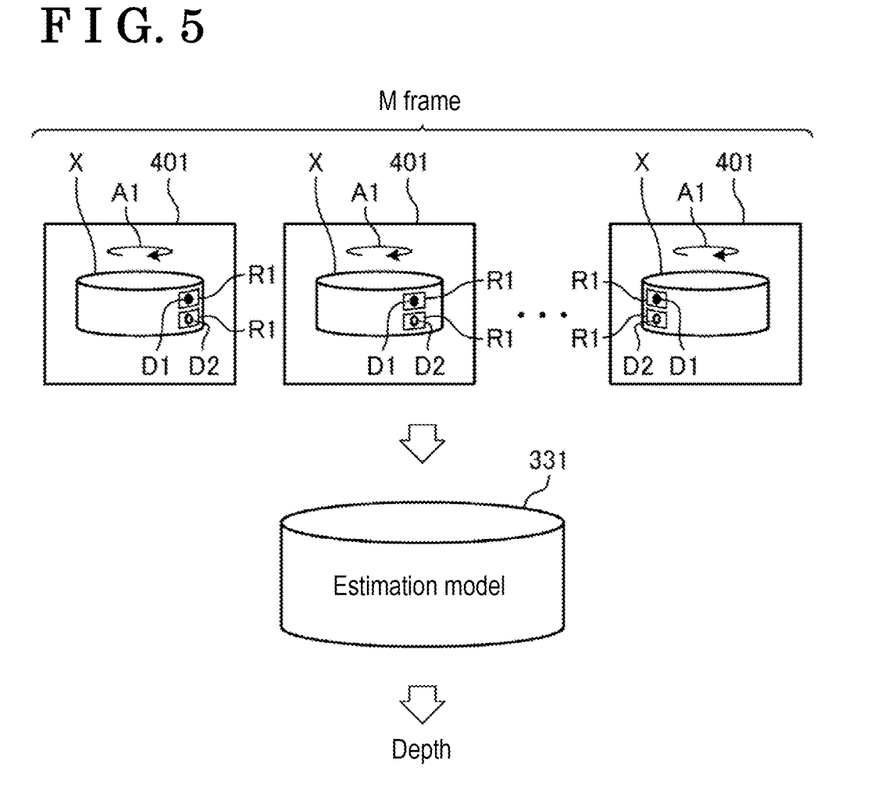
FIG. 5 is an exemplified and schematic view illustrating an estimation model of the embodiment.

In an example illustrated in FIG. 5, the image 401 of the M frame serving as the output from the extraction model 321 shown in FIG. 4 is inputted to the estimation model 331 as the abnormality-candidate image. The area R1 which includes the defect D1 and the contamination D2 as the abnormality-candidate parts is specified in the image 401. The change of the position of the area R1 can be traced from the image 401.

The estimation model 331 of the embodiment outputs (the estimation result of) the depths of the defect D1 and the contamination D2 in the image 401 in response to the input of the image 401 as the abnormality-candidate image. Two types of depth illustrated in FIG. 6 can be used in the embodiment.

Figure 6:
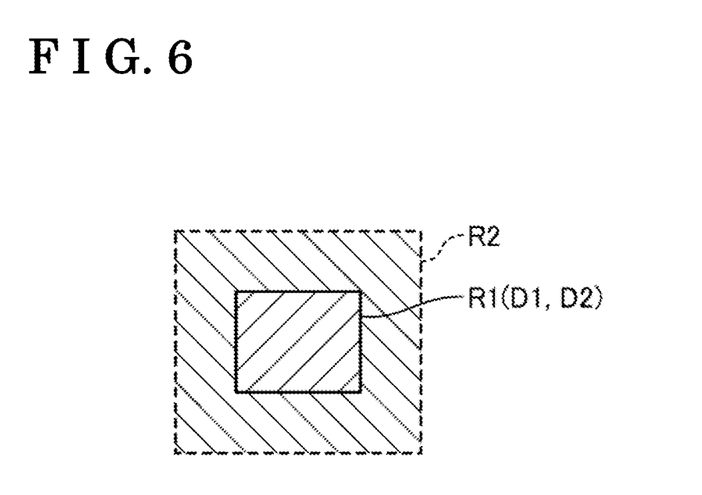
FIG. 6 is an exemplified and schematic view for explaining two types of depth which can be used in the embodiment.

As shown in FIG. 6, in the embodiment, two types of depths which are a first depth serving as a depth of the area R1 as a first area of an inner side of the abnormality-candidate part, and a second depth serving as a depth of an area R2 as a second area of a circumference of the abnormality-candidate part. The area R2 is configured as a difference between an area where the area R1 is increased by double and the area R1.

The first depth corresponds to the characteristics of the abnormality-candidate part itself of the object X, and the second depth corresponds to the characteristics of the surface of the circumference of the abnormality-candidate parts of the object X. Thus, by using this two types of depths, the difference between the abnormality-candidate part and the surface of the circumference thereof can be clearly evaluated.

As shown in FIG. 3, the detection process unit 340 detects whether the abnormality-candidate part of the abnormality-candidate image detected by the extraction process unit 320 is determined to be abnormal or not based on the depth estimated by the estimation process unit 330. More specifically, based on the characteristics of the depths shown in FIG. 7, the estimation process unit 330 determines whether the abnormality-candidate part corresponds to the defect D1 which should be detected to be abnormal, or the contamination D2 which should not be detected as abnormal.

Figure 7:
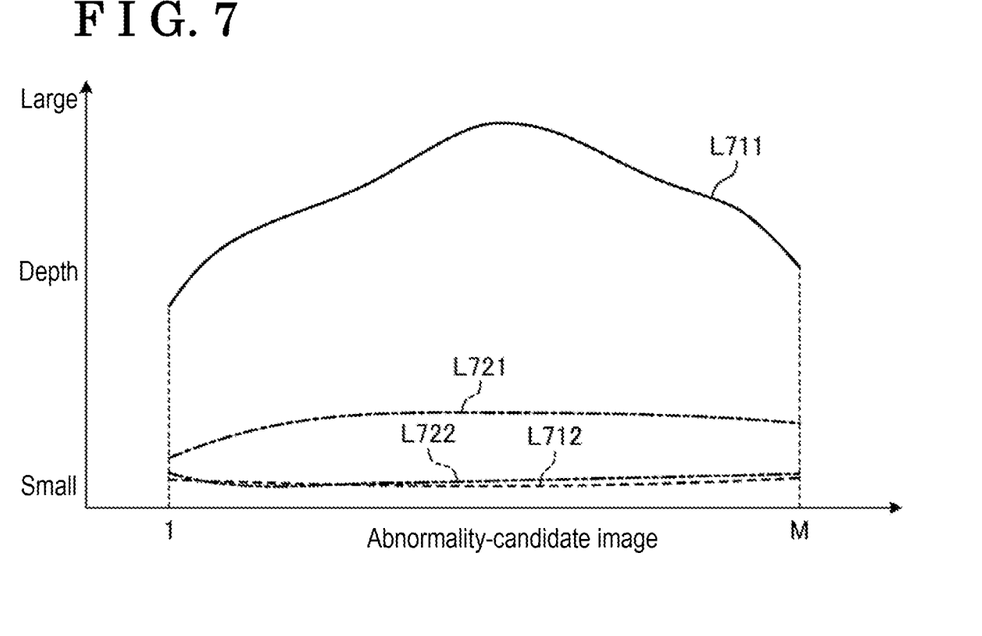
FIG. 7 is an exemplified and schematic view for explaining a characteristic of the depth of the embodiment.

In an example shown in FIG. 7, a solid line L711 and a dashed line L712 correspond to the first depth and the second depth, respectively, in a case where the defect D1 corresponds to the abnormality-candidate part of the abnormality-candidate images which are imaged between 1 to the M frame. A dashed-and-dotted line L721 and a dashed and a double-dotted line L722 correspond to the first depth and the second depth, respectively, in a case where the contamination D2 corresponds to the abnormality-candidate part of the abnormality-candidate images which are captured between 1 to the M frame.

As shown in FIG. 7, the second depth hardly has a difference between a case where the defect D1 corresponds to the abnormality-candidate part and the contamination D2 corresponds to the abnormality-candidate part (see the dashed line L712 and the L722). However, the first depth largely differ from a case where the defect D1 corresponds to the abnormality-candidate part and the contamination D2 corresponds to the abnormality-candidate part (see the solid line L711 and the dashed-and-dotted line L721).

More specifically, the first depth in a case where the defect D1 corresponds to the abnormality-candidate part is larger as a whole than the first depth in a case where the contamination D2 corresponds to the abnormality-candidate part. The first depth in a case where the defect D1 corresponds to the abnormality-candidate part includes a peak in the abnormality-candidate image of the frame which corresponds to the timing when the defect D1 and the imaging device 20 face with each other, whereas the first depth in a case where the contamination D2 corresponds to the abnormality-candidate part does not include the peak.

Thus, by focusing on the first depth itself or the difference between the first depth and the second depth, the detection whether the abnormality-candidate part corresponds to the defect D1 or the contamination D2 is assumed to be achieved.

Considering above, in the embodiment, the detection process unit 340 detects whether the abnormality-candidate part corresponds to abnormal based on the first depth itself or the difference between the first depth and the second depth.

For example, the detection process unit 340 can detect whether the abnormality-candidate part corresponds to abnormal based on a comparison result of the first depth and a threshold value. In this case, in an example shown in FIG. 7, the threshold value is preset as a value corresponding to the depth between the solid line L711 and the dashed-and-dotted line L721.

The detection process unit 340 can detect whether the abnormality-candidate part corresponds to abnormal based on an average value or the integral value of the difference between the first depth and the second depth. In this case, the average value (and the integral value) is calculated from values of the number of M based on the abnormality-candidate image of 1 to the M frame.

In the embodiment, the method for detecting the abnormality using the threshold value can be operated by targeting the difference between the first and second depths. The method for detecting the abnormality using the average value or the integral value of the difference can be operated by targeting a first threshold value. In the embodiment, the method for detecting the abnormality using the threshold value and the method for detecting the abnormality using the average value or the integral value of the difference are effective when being operated independently or jointly.

Figure 8:
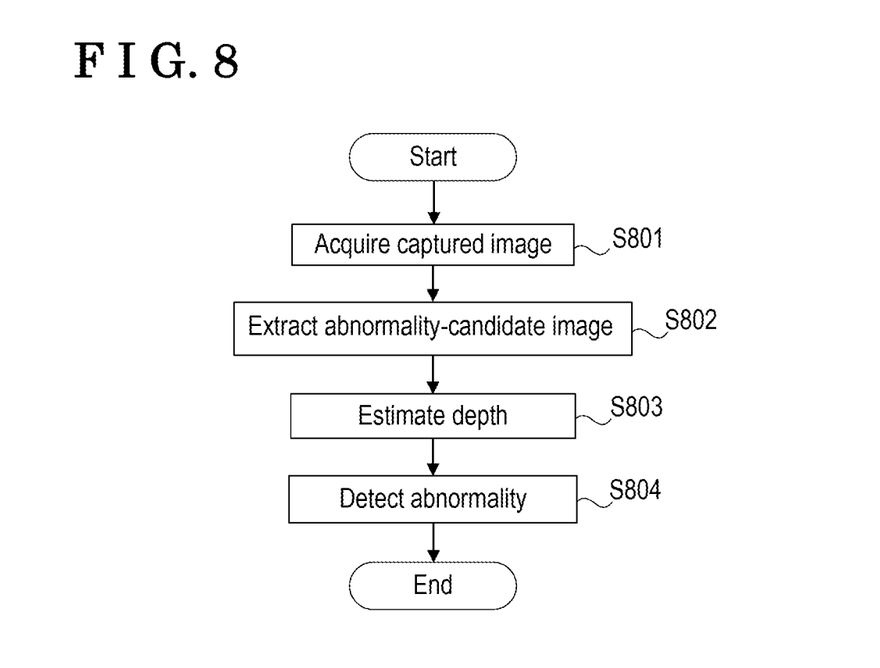
FIG. 8 is an exemplified flowchart illustrating a series of process executed by the abnormality detection device of the embodiment.

Based on the aforementioned configuration, the abnormality detection device 30 of the embodiment operates a series of process shown in FIG. 8 to detect the abnormality of the object X. The series of process shown in FIG. 8 starts in accordance with the operation input of a user via, for example, the input device 31.

As shown in FIG. 8, in the embodiment, the acquisition process unit 310 of the abnormality detection device 30 acquires plural captured images captured by the imaging device 20 in Step S801.

In Step S802, the extraction process unit 320 of the abnormality detection device 30 extracts the plural abnormality-candidate images from the plural captured images acquired in Step S801 by using the extraction model 321. Here, the abnormality-candidate parts in the abnormality-candidate images are specified.

In Step S803, the estimation process unit 330 of the abnormality detection device 30 estimates the depth of the abnormality-candidate part based on the change of the abnormality-candidate part between the plural abnormality-candidate images extracted in Step S802 by using the estimation model 331.

Then, in Step S804, the detection process unit 340 of the abnormality detection device 30 detects the abnormality of the object X based on the depth estimated in Step S803. That is, the detection process unit 340 detects whether the abnormality-candidate part corresponds to the defect D1 as the abnormality to be detected, or the contamination D2 as the abnormality not to be detected. The detection result of the abnormality is notified to an operator of the abnormality detection device 30 via, for example, the output device 32. Then, the process ends.

The hardware configuration of the abnormality detection device 30 of the embodiment will be explained. The abnormality detection device 30 of the embodiment is configured, for example, as a computer 900 including a hardware configuration shown in FIG. 9.

Figure 9:
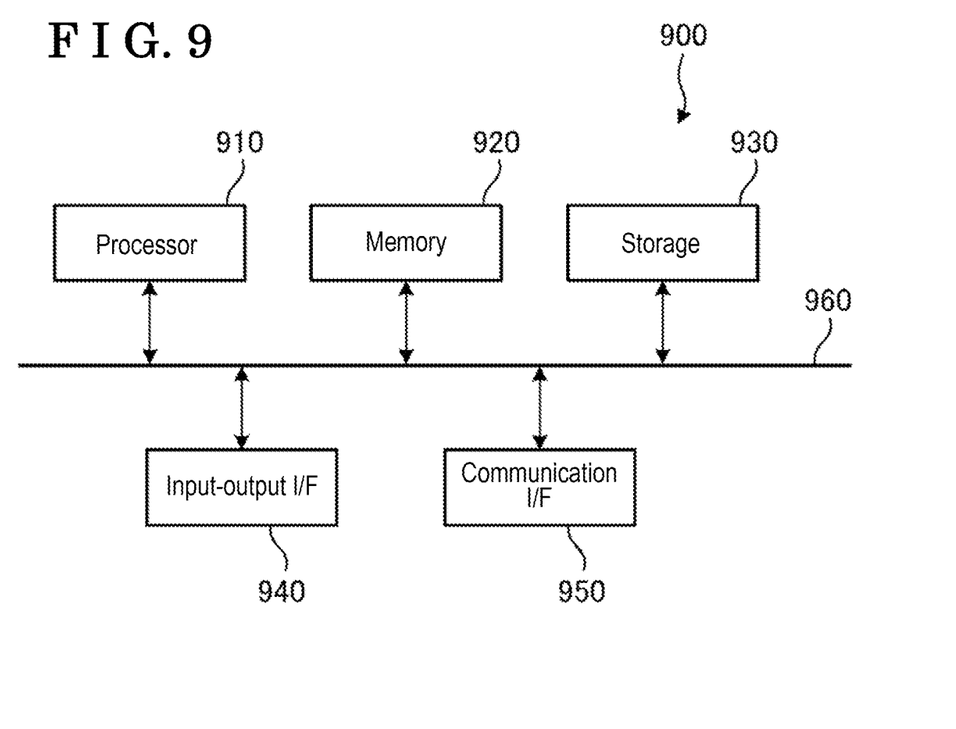
FIG. 9 is an exemplified and schematic view illustrating a hardware configuration of a computer configuring the abnormality detection device of the embodiment.

As shown in FIG. 9, the computer 900 includes a processor 910, a memory 920, a storage 930, an input-output interface (I/F) 940, and a communication interface (I/F) 950. These hardware components are connected to a bus 960.

The processor 910 is configured as a Central Processing Unit or a CPU, and controls integrally the operation of each part of the computer 900.

The memory 920 includes such as a Read Only Memory or a ROM, and a Random Access Memory or a RAM, to store data such as programs operated by the processor 910 in a volatile or non-volatile manner, and to provide operation area for the processor 910 to operate the programs.

The storage 930 includes, for example, a Hard Disk Drive or a HDD, or a Solid State Drive or a SSD, and stores data in a non-volatile manner.

The input-output interface 940 controls the input of data from the input device 31 (see FIG. 1) to the computer 900, and output of data from the computer 900 to the output device 32 (see FIG. 1).

The communication interface 950 allows the computer 900 to communicate with other devices.

In the embodiment, the functional modules shown in FIG. 3 are provided by the collaboration of the hardware and the software as a result in which the processor 910 operate the abnormality detection program stored in the memory 920 or the storage 930. Alternatively, in the embodiment, at least a part of the functional modules shown in FIG. 3 can be operated only by a dedicated hardware (circuit).

The abnormality detection program does not necessarily have to be stored in the memory 920 or the storage 930 in advance. For example, the abnormality detection program can be provided as a computer program product which is stored in an installable manner to a storage medium readable by the computer 900 or operable thereby, the storage medium such as any type of magnetic disk such as a flexible disk or any type of an optical disk such as a Digital Versatile Disk or a DVD.

The abnormality detection program can be provided or distributed via a network such as internet. That is, the abnormality detection program can be provided by being downloaded via a network in a state of being stored on a computer connected to the network such as the internet.

According to the aforementioned embodiment, the abnormality detection device (30) includes the acquisition process unit (310) configured to acquire the plural captured images captured by the imaging device to image the object (X) in different positions or postures in a mode in which the relative positional or postural relationship between the imaging device (20) and the object (X) is specifiable in each of the plural captured images, the extraction process unit (320) configured to extract the plural abnormality-candidate images in which the abnormality-candidate part is imaged from the plural captured images, the abnormality-candidate part corresponding to the part that possibly includes an abnormality on the surface of the object (X), the estimation process unit (330) configured to estimate the depth of the abnormality-candidate part with respect to the surface of the object (X) in each of the plural abnormality-candidate images based on the change of the abnormality-candidate part between the plural abnormality-candidate images, and the detection process unit (340) configured to detect whether the abnormality-candidate part corresponds to abnormal based on the depth of the abnormality-candidate part in each of the plural abnormality-candidate images.

According to the aforementioned configuration, the abnormality can be detected by distinguishing the defect D1 which is to be detected as abnormal and the contamination D2 which is not to be detected as abnormal in consideration of the three-dimensional characteristic which is depth. Thus, the object X is prevented from being detected excessively or immoderately.

According to the aforementioned embodiment, the extraction process unit (320) is configured to extract the plural abnormality-candidate images from the plural captured images using the extraction model (321) trained by machine learning to output the plural abnormality-candidate images in response to the input of the plural captured images, and the estimation process unit (330) is configured to estimate the depth of the abnormality-candidate part in each of the plural abnormality-candidate images using the estimation model (331) trained by machine learning to output the depth of the abnormality-candidate part in each of the plural abnormality-candidate images in response to the input of the plural abnormality-candidate images.

According to the aforementioned configuration, the abnormality-candidate images can be extracted and the depth can be estimated by a simple process using the extraction model 321 and the estimation model 331.

According to the aforementioned embodiment, the estimation process unit (330) is configured to acquire the first depth indicating a depth with respect to the surface of the object (X) of the first area (R1) of an inside of the abnormality-candidate part as the depth of the abnormality-candidate part, and the detection process unit (340) is configured to detect whether the abnormality-candidate part corresponds to abnormal based on the first depth in each of the plural abnormality-candidate images.

According to the aforementioned configuration, the abnormality can be appropriately detected in consideration of inside of the abnormality-candidate part.

According to the aforementioned embodiment, the detection process unit (340) is configured to detect whether the abnormality-candidate part corresponds to abnormal based on the comparison between the first depth and the predetermined threshold value.

According to the aforementioned configuration, the abnormality can be detected by a simple process using the threshold value.

According to the aforementioned embodiment, the estimation process unit (330) is configured to acquire, as the depth of the abnormality-candidate part, the first depth indicating the depth with respect to the surface of the object (X) of the first area (R1) of the inside of the abnormality-candidate part, and the second depth indicating a depth with respect to the surface of the object (X) of the second area (R2) of the circumference of the abnormality-candidate part, and the detection process unit (340) is configured to detect whether the abnormality-candidate part corresponds to abnormal based on the first depth and the second depth.

According to the aforementioned configuration, the abnormality can be appropriately detected in consideration of inside and outside of the abnormality-candidate part.

According to the aforementioned embodiment, the detection process unit (340) is configured to detect whether the abnormality-candidate part corresponds to abnormal based on the difference between the first depth and the second depth.

According to the aforementioned configuration, the abnormality can be appropriately detected in consideration of the difference between inside and outside of the abnormality-candidate part.

According to the aforementioned embodiment, the detection process unit (340) is configured to detect whether the abnormality-candidate part corresponds to abnormal based on the average value or the integral value of the difference between the first depth and the second depth.

According to the aforementioned configuration, the abnormality can be easily and appropriately detected in consideration of the average value or the integral value of the difference between the first depth and the second depth.

According to the aforementioned embodiment, the acquisition process unit (310) is configured to acquire the plurality of captured images from the imaging device (20) imaging the object (X) at a constant time interval while the position or the posture of at least one of the imaging device (20) and the object (20) continuously changes at a certain speed.

According to the aforementioned configuration, the captured image in a mode in which the relative position or posture between the imaging device 20 and the object X can be specified can be easily acquired.

Modified examples of the aforementioned embodiment will hereunder be explained. In the aforementioned embodiment, the posture of the object X with respect to the imaging device 20 fixed by the stage 10 configured as a so-called single-axis rotary stage moves to change the relationship between the relative postures of the imaging device 20 and the object X. Alternatively, the disclosure is applicable to a configuration in which a so-called double-axis rotary stage changes the posture of the object X, or a configuration in which a position of the object X moves in addition to the posture thereof. The disclosure is also applicable to a configuration in which only a position of the object X moves by using a so-called single-axis linear-motion stage.

In the aforementioned embodiment, the configuration in which the imaging device 20 is fixedly set or arranged is exemplified. Alternatively, the disclosure is applicable to a configuration in which the imaging device 20 is not fixedly set. As a modified example, a configuration in which the imaging device 20 is movably set while the object X is fixedly set as shown in FIG. 10 can be considered.

Figure 10:
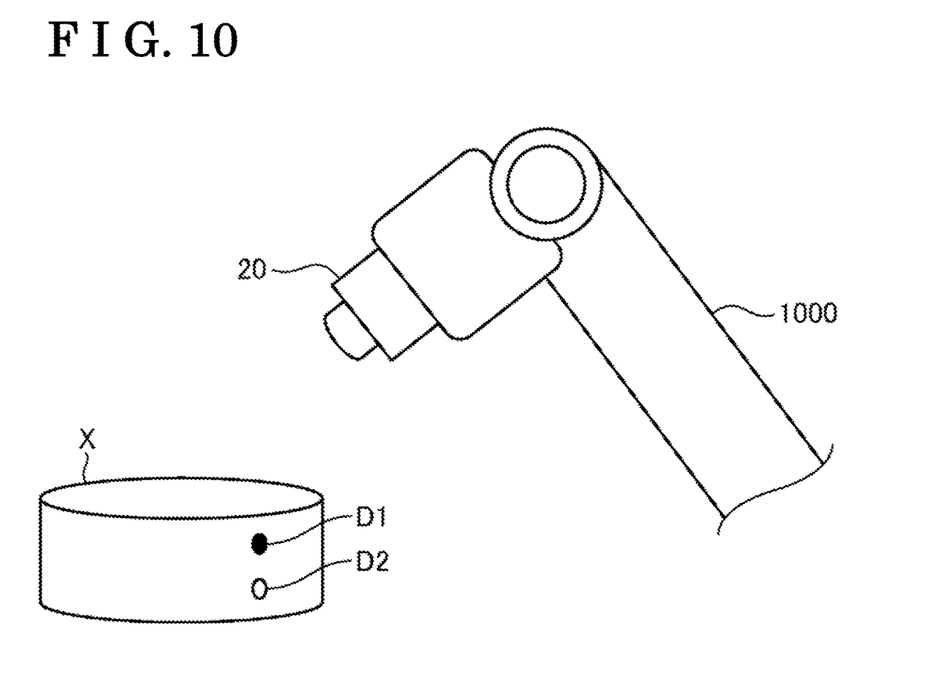
FIG. 10 is an exemplified and schematic block diagram illustrating an imaging method of the object according to a modified example of the embodiment.

In the modified example shown in FIG. 10, the imaging device 20 is mounted on a robot arm 1000. Accordingly, the imaging device 20 captures the images of the object X which is fixedly set while changing the position and posture thereof in response to the movement of the robot arm 1000. In this configuration, the plural captured images including the object X with different positions and postures can be obtained, and the similar effect as that of the aforementioned embodiment can be obtained based on the similar technical idea.

As another modified example, a configuration in which the positions and the postures of both of the imaging device 20 and the object X change can be considered. As another modified embodiment, a configuration in which the plural imaging devices 20 surround the object X to capture the images of the object X from plural angles can be considered. According to these configurations, the similar effect as that of the aforementioned embodiment can be obtained based on the similar technical idea.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An abnormality detection device, comprising:
a processor configured to
    acquire a plurality of captured images captured by an imaging device to image an object in different positions or postures in a mode in which a relative positional or postural relationship between the imaging device and the object is specifiable in each of the plurality of captured images;
    extract a plurality of abnormality-candidate images in which an abnormality-candidate part is imaged from the plurality of captured images, the abnormality-candidate part corresponding to a part that possibly includes an abnormality on a surface of the object;
    estimate a depth of the abnormality-candidate part with respect to the surface of the object in each of the plurality of abnormality-candidate images based on a change of the abnormality-candidate part between the plurality of abnormality-candidate images; and
    detect whether the abnormality-candidate part corresponds to abnormal based on the depth of the abnormality-candidate part in each of the plurality of abnormality-candidate images,
wherein the processor is configured to acquire, as the depth of the abnormality-candidate part,
    a first depth indicating a depth with respect to the surface of the object of a first area of an inside of the abnormality-candidate part, and
    a second depth indicating a depth with respect to the surface of the object of a second area of a circumference of the abnormality-candidate part, and the processor is configured to detect whether the abnormality-candidate part corresponds to abnormal based on the first depth and the second depth.

2. The abnormality detection device according to claim 1, wherein the processor is configured to extract the plurality of abnormality-candidate images from the plurality of captured images using an extraction model trained by machine learning to output the plurality of abnormality-candidate images in response to an input of the plurality of captured images; and the processor is configured to estimate the depth of the abnormality-candidate part in each of the plurality of abnormality-candidate images using an estimation model trained by machine learning to output the depth of the abnormality-candidate part in each of the plurality of abnormality-candidate images in response to the input of the plurality of abnormality-candidate images.

3. The abnormality detection device according to claim 1, wherein the processor is configured to acquire the first depth indicating Hall the depth with respect to the surface of the object of a first area of an inside of the abnormality-candidate part as the depth of the abnormality-candidate part; and the processor is configured to detect whether the abnormality-candidate part corresponds to abnormal based on the first depth in each of the plurality of abnormality-candidate images.

4. The abnormality detection device according to claim 3, wherein the processor is configured to detect whether the abnormality-candidate part corresponds to abnormal based on a comparison between the first depth and a predetermined threshold value.

5. The abnormality detection device according to claim 1, wherein the processor is configured to detect whether the abnormality-candidate part corresponds to abnormal based on a difference between the first depth and the second depth.

6. The abnormality detection device according to claim 5, wherein the processor is configured to detect whether the abnormality-candidate part corresponds to abnormal based on an average value or an integral value of the difference between the first depth and the second depth.

7. The abnormality detection device according to claim 1, wherein the processor is configured to acquire the plurality of captured images from the imaging device imaging the object at a constant time interval while the position or the posture of at least one of the imaging device and the object continuously changes at a certain speed.

* * * * *